Oct. 4, 1955 J. K. ERZER 2,719,491
RAILWAY VEHICLE TRUCK
Filed Dec. 22, 1950
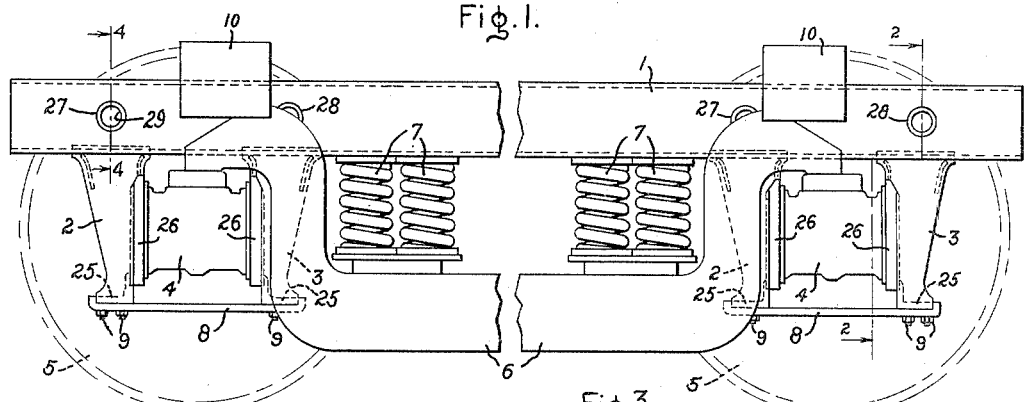
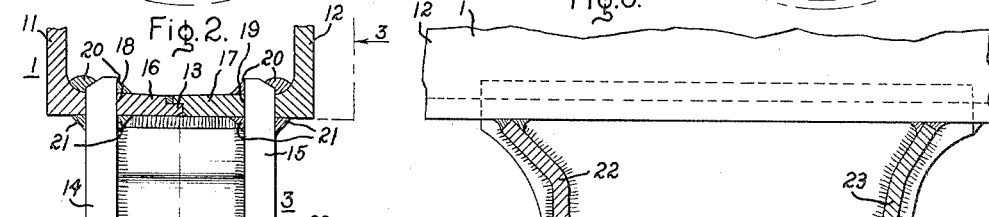
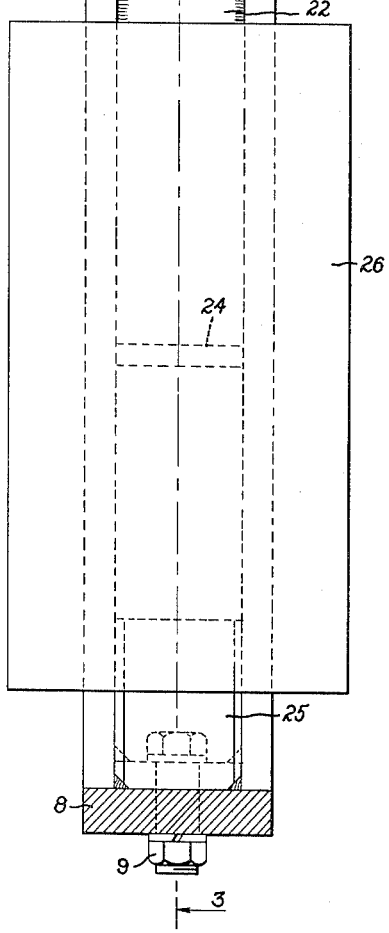
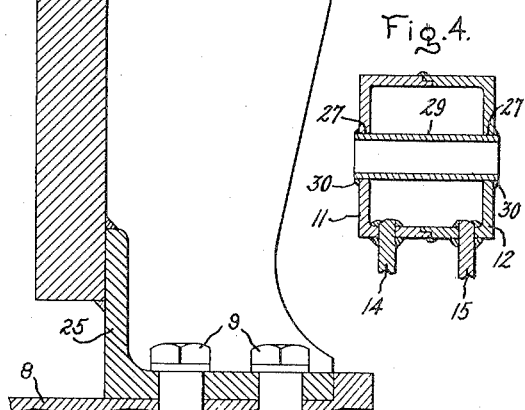
Inventor:
John K. Erzer,
by Ernest C. Britton
His Attorney.

United States Patent Office 2,719,491
Patented Oct. 4, 1955

2,719,491

RAILWAY VEHICLE TRUCK

John K. Erzer, Erie, Pa., assignor to General Electric Company, a corporation of New York Application December 22, 1950, Serial No. 202,230

6 Claims. (Cl. 105—206)

This invention relates to rail vehicle trucks and more particularly to trucks having fabricated frames.

An object of this invention is to provide an improved rail vehicle truck.

Another object of this invention is to provide an improved fabricated frame for a rail vehicle truck.

A further object of this invention is to provide an improved welded frame for a rail vehicle truck.

Further objects and advantages of this invention will become apparent and the invention will be better understood by reference to the following description and the accompanying drawing, and the features of novelty which characterize this invention will be pointed out with particularity in the claims annexed to and forming a part of this specification.

The frame structures for rail vehicle trucks, particularly trucks of the type used in diesel electric locomotives, are conventionally of cast construction. It has been found more economical, however, to fabricate the frame by welding the various components. In accordance with this invention, therefore, a longitudinal side frame member is provided formed of a pair of channel members having their flanges welded together to form an enclosed substantially box-shaped cross section. A pair of pedestal arms depend from the side frame for straddling a journal box and for guiding the vertical movement thereof, each of the pedestal arms comprising a pair of spaced-apart plate members. The bottom flange of each of the channel members has a pair of longitudinally extending spaced-apart openings formed therein communicating with the interior, the openings in each flange being respectively in transverse alignment. The upper end of each of the plate members is respectively arranged in the openings and extends into the interior of the frame member. These plates are secured to the channels by welds formed on both sides of the flanges. Bearing blocks are secured to the inner edges of the plate pairs for guiding the journal box and a tie bar connects the lower extremities of the pedestal arms. In manufacture, a pair of longitudinally spaced-apart openings are formed in a flange of each of a pair of channel members. A pair of longitudinally spaced-apart openings are also formed in the web of each of the channel members adjacent the flange openings. The channels are then joined together welding the flanges so that a box section is formed with the flange openings being arranged in longitudinally spaced-apart pairs. One end of a pedestal plate member is then inserted in each of the flange openings and is secured to the flange by welding on either side thereof, the welds on the interior of the flange being made through the web openings. The pedestal plate members are thus respectively arranged in longitudinal spaced-apart pairs, each pair forming a pedestal arm. Bearing blocks are then secured to the inner edges of the plate member pairs by welding and the lower extremities of the pedestal arms connected by a tie bar.

In the drawing, Fig. 1 is a side elevational view illustrating the improved fabricated truck frame construction of this invention; Fig. 2 is a fragmentary cross sectional view taken along the line 2—2 of Fig. 1; and Fig. 3 is a side elevational view, partly in section, taken along the line 3—3 of Fig. 2; and Fig. 4 is a cross-sectional view taken along the lines 4—4 of Fig. 1.

Referring now to Fig. 1, there is shown a rail vehicle truck having a side frame 1, it being understood that only one side of the truck structure is here shown and that the opposite side is identical. The side frame 1 and its duplicate on the opposite side of the truck may be connected by suitable transoms (not shown) and the complete truck frame structure may be connected to the vehicle body by a suitable center bearing (also not shown). At each end of the side frame 1, depending pedestal arms 2 and 3 are provided for straddling journal boxes 4 and for guiding the vertical movement thereof. The journal boxes 4 rotatably support the axles (not shown) of wheels 5 and are interconnected by equalizer 6. Suitable coil springs 7 are interposed between the equalizer 6 and the side frame 1. The lower extremities of the pedestal arms 2 and 3 are connected by a tie bar 8 secured by suitable bolts 9. Suitable brake cylinder supports 10 are provided on the side frame 1 for maintaining the brake actuating cylinder (not shown).

Referring now to Figs. 2, 3, and 4, the side frame 1 is preferably formed of two channel members 11 and 12 having their flanges integrally connected, as by welding, as shown at 13 to form a tubular or hollow elongated member having an enclosed substantially box-shaped cross section. Each of the pedestal arms, arm 3 being here shown, is formed of two pedestal side plates 14 and 15. These side plates are arranged longitudinally of the side frame 1 and are transversely spaced apart, as shown in Fig. 2. The flange portion 16 of the channel 11 and the flange portion 17 of the channel 12 which together form the bottom wall of a channel having side walls 11 and 12 are respectively provided with longitudinally extending openings 18 and 19 formed therein communicating with the interior of the box section. Thus, for each pair of pedestal arms 2 and 3, each of the flanges will be provided with two longitudinally spaced apart openings. The openings 18 and 19 are transversely spaced apart and in transverse alignment, and it will be understood that the corresponding openings for accommodating the pedestal side plates of the pedestal arm 2 are similarly arranged. The upper ends of the pedestal side plates 14 and 15 are respectively arranged in the openings 18 and 19 and extend into the interior of the box section. They are secured to the side frame 1 by integral connections, such as welding, on both sides of the flanges 16 and 17, as at 20 and 21. Tie plates 22 and 23 and spacer 24 are arranged between the pedestal side plates 14 and 15 and are respectively welded thereto. An angle member 25 is arranged between the lower extremities of the side plates 14 and 15 and the tie bar 8 is connected thereto by means of bolts 9. Pedestal bearing blocks 26 are secured to the inner edges of the pedestal side plates 14 and 15 by welding and serve to guide the vertical motion of the journal boxes 4. As will be hereinafter described, the welds 20 on the interior of the box section 1 are made through the openings 27 and 28 in the web portions of the channels 11 and 12. In order to prevent the entrance of water and other foreign matter through the openings 27 and 28, sections of pipe 29 are respectively positioned in the openings and are welded to the channels 11 and 12, as at 30. The channel members 11 and 12 are thereby connected by the pipe sections 29, providing additional reinforcement for the box section.

In manufacture, the longitudinally extending openings 18 and 19 are first formed in the flanges 16 and 17 of the channel members 11 and 12 and other openings 27 and 28 are formed in the webs of the channel members adjacent the flange openings. While Fig. 1 shows the openings 27 and 28 in only one of the channel members, it will be understood that both channel members 11 and 12 are provided with these openings. The channel members 11 and 12 are then joined by welding the edges of the flanges 16 and 17, as at 13, to form the resultant box-shaped cross section. The pedestal side plates 14 and 15, already joined by tie plates 22 and 23, spacer 24, and angle 25, are then respectively arranged in the longitudinally extending openings 18 and 19 and are secured to the flanges 16 and 17 by welds 20 and 21, the welds 20 on the interior of the box section being made through the web openings 27 and 28. Short pieces of pipe 29 are then respectively positioned in the web openings 27 and 28 and the ends thereof welded to the channel members 11 and 12, as at 30. This prevents the entrance of water and other foreign matter into the inside of the box section and provides reinforcement for the box section. The pedestal block 26 is then welded to the inner faces of the pedestal side plates 14 and 15 to complete the assembly.

It will now be readily apparent that this invention provides an improved fabricated truck frame construction characterized by its simplicity, ease of assembly and rigidity. This structure is much lighter than the conventional cast construction, represents a cost reduction through the saving in material, and provides improved strength characteristics.

While I have shown and described a specific embodiment and method of this invention, further modifications and improvements will occur to those skilled in the art. I desire it to be understood, therefore, that this invention is not limited to the embodiment shown and I intend in the appended claims to cover all modifications within the spirit and scope of this invention.

What I claim as new and desire to secure by Letters Patent of the United States is:

1. In a rail vehicle truck, an elongated longitudinally extending side frame member including a channel member having a bottom wall and upwardly extending side walls, and a pair of spaced-apart pedestal arms depending from said side frame for straddling a journal box and guiding the vertical movement thereof, said bottom wall of said channel member having a pair of openings formed therein over each pedestal arm, the upper ends of said pedestal arms being respectively arranged in said openings and extending through said bottom wall, said pedestal arms being secured to said channel member by integral connections formed on both sides of said bottom wall.

2. In a rail vehicle truck, a hollow elongated longitudinally extending side frame member having an enclosed box-shaped cross section, and a pair of longitudinally spaced-apart pedestal arms depending from said side frame for straddling a journal box and guiding the vertical movement thereof, each of said pedestal arms comprising a pair of transversely spaced-apart plate members, the under side of said frame member having a plurality of longitudinally spaced pairs of transversely spaced longitudinal openings formed therein, the upper ends of said plate members being respectively arranged in said openings and secured to said frame member.

3. In a rail vehicle truck, a hollow elongated longitudinally extending side frame member having an enclosed box-shaped cross section, and a pair of longitudinally spaced-apart pedestal arms depending from said side frame for straddling a journal box and guiding the vertical movement thereof, each of said pedestal arms comprising a pair of transversely spaced-apart plate members, the lower wall of said frame member having a plurality of longitudinally spaced pairs of transversely spaced longitudinal openings formed therein communicating with the interior thereof, the upper ends of said plate members being respectively arranged in said openings and extending into the interior of said frame member, said plates being secured to said frame member by integral connections formed on both sides of said lower wall.

4. In a rail vehicle truck, a longitudinally extending side frame member comprising a pair of channel members having their flanges joined by integral connections to provide an enclosed substantially box-shaped cross section, and a pair of longitudinally spaced-apart pedestal arms depending from said side frame for straddling a journal box and guiding the vertical movement thereof, each of said pedestal arms comprising a pair of transversely spaced-apart plate members, the bottom flange of each of said channels having a pair of longitudinally spaced-apart, longitudinally extending openings formed therein communicating with the interior of said box section, said openings in each of said flanges being respectively in transverse alignment, the upper ends of said plate members being respectively arranged in said openings and extending into the interior of said frame member, said plates being secured to said channels by integral connections formed on both sides of said bottom flanges.

5. In a rail vehicle truck, a hollow elongated longitudinally extending side frame member having an enclosed box-shaped cross section, a pair of longitudinally spaced-apart pedestal arms depending from said side frame for straddling a journal box and for guiding the vertical movement thereof, each of said pedestal arms comprising a pair of transversely spaced-apart plate members, the lower wall of said frame member having a plurality of longitudinally spaced pairs of transversely spaced longitudinal openings formed therein communicating with the interior thereof, the upper ends of said plate members being respectively arranged in said openings and extending into the interior of said frame member, said plates being secured to said frame member by integral connections formed on both sides of said wall, and a bearing block secured to the inner edges of each of said plate member pairs by integral connections for guiding a journal box.

6. In a rail vehicle truck, a longitudinally extending side frame member comprising a pair of channel members having their flanges joined by intergral connections to provide an enclosed substantially box-shaped cross section, a pair of longitudinally spaced-apart pedestal arms depending from said side frame for straddling a journal box and for guiding the vertical movement thereof, each of said pedestal arms comprising a pair of transversely spaced-apart plate members, the bottom flange of each of said channels having a pair of longitudinally spaced-apart, longitudinally extending openings formed therein communicating with the interior of said box section, said openings in each of said flanges being respectively in transverse alignment, the upper ends of said plate members being respectively arranged in said openings and extending into the interior of said frame member, said plates being secured to said channels by integral connections formed on both sides of said bottom flanges, the web sections of said channel members having openings formed therein communicating with the interior of said box section for providing access to the interior of said box section for forming said integral connections, and members respectively positioned in said web openings and extending transversely across said box section for preventing the entrance of foreign matter to the interior of said box section and for strengthening said box section.

References Cited in the file of this patent

UNITED STATES PATENTS

| | | |
|---|---|---|
| 571,525 | Hewitt | Nov. 17, 1896 |
| 1,125,291 | Forsyth | Jan. 19, 1915 |
| 1,422,116 | Mathers | July 11, 1922 |
| 2,065,453 | Hammerstrom | Dec. 22, 1936 |
| 2,113,964 | Robinson et al. | Apr. 12, 1938 |
| 2,231,848 | Eksergian | Feb. 11, 1941 |
| 2,342,864 | Holin | Feb. 29, 1944 |